April 21, 1959     D. J. KINTNER     2,883,104

CASH REGISTER DRAWER SELECTING APPARATUS

Filed June 20, 1955                         4 Sheets-Sheet 1

INVENTOR,
Donald J. Kintner
BY

ATTORNEY.

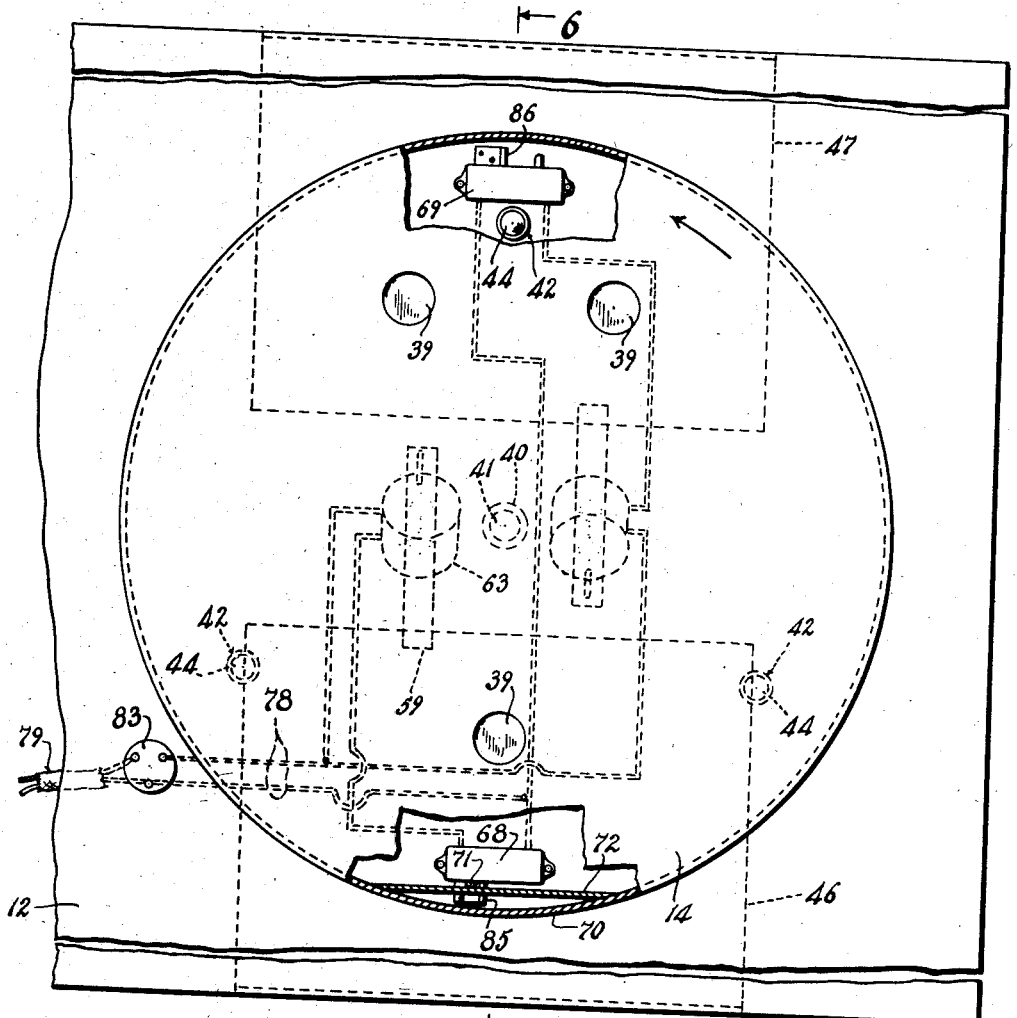
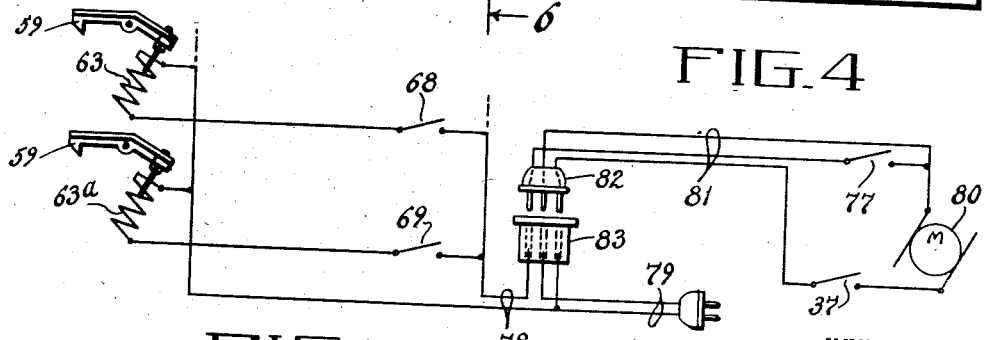

April 21, 1959  D. J. KINTNER  2,883,104
CASH REGISTER DRAWER SELECTING APPARATUS
Filed June 20, 1955  4 Sheets-Sheet 3
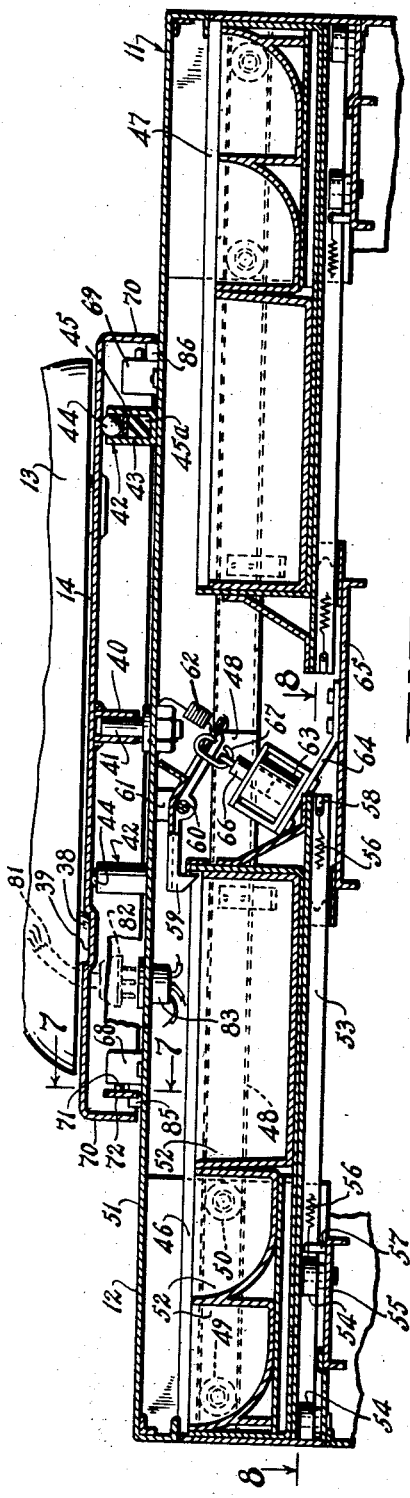
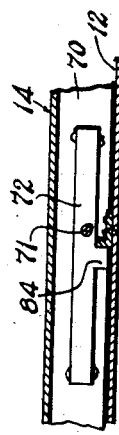
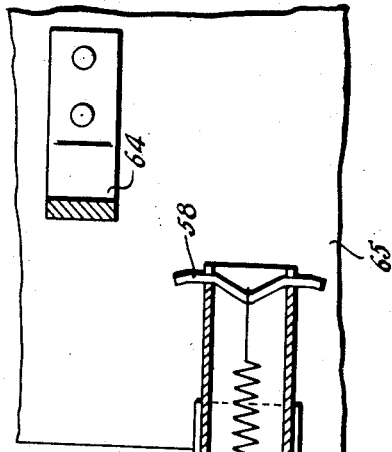
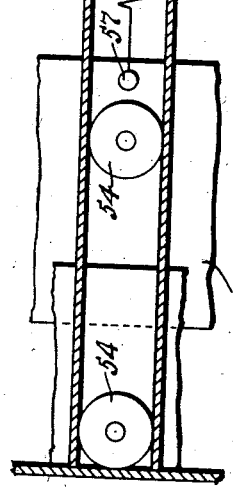
INVENTOR,
Donald J. Kintner
BY
ATTORNEY.

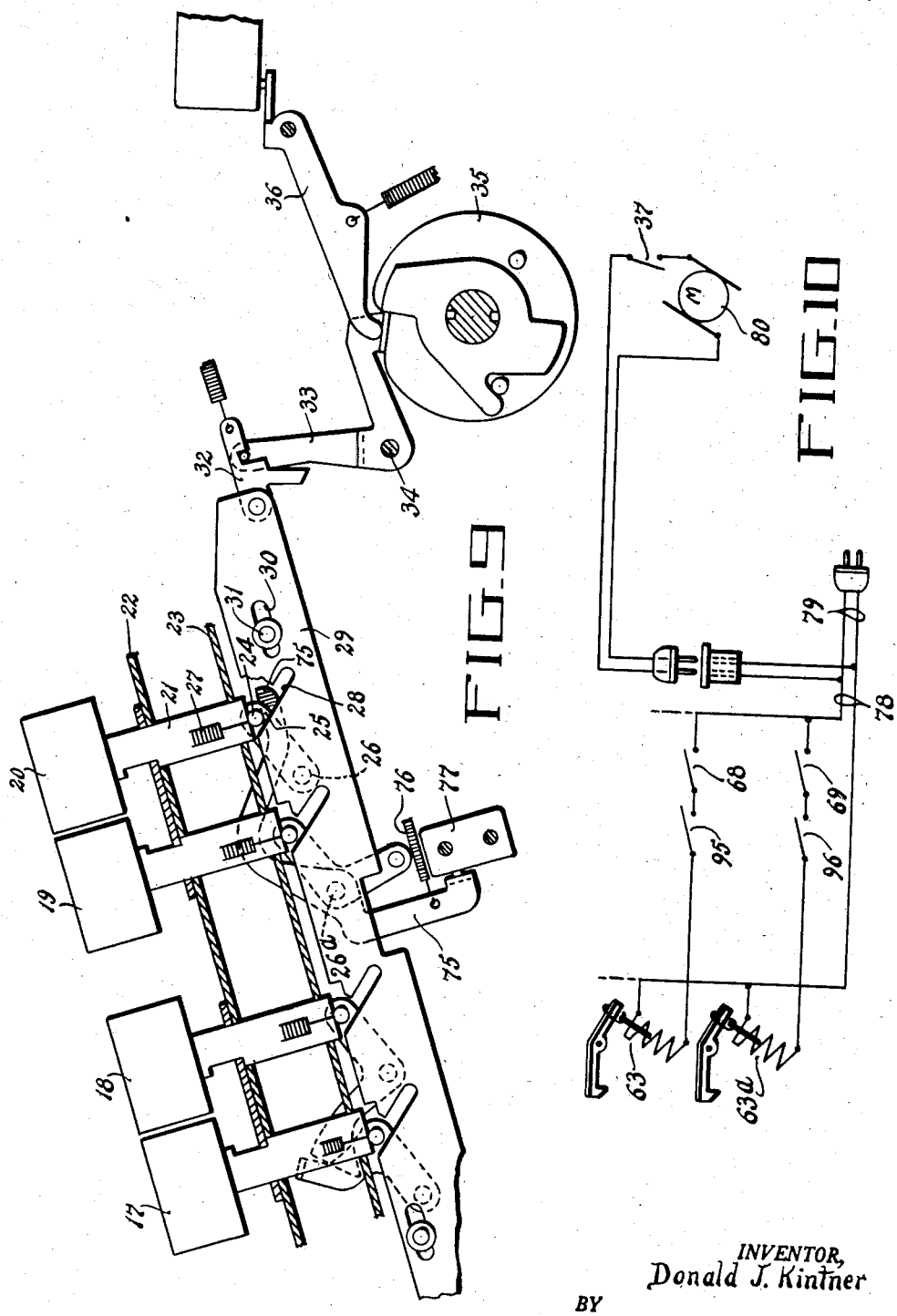

United States Patent Office 2,883,104
Patented Apr. 21, 1959

2,883,104

CASH REGISTER DRAWER SELECTING APPARATUS

Donald J. Kintner, San Gabriel, Calif., assignor to Clary Corporation, San Gabriel, Calif., a corporation of California Application June 20, 1955, Serial No. 516,711

8 Claims. (Cl. 235—22)

This invention relates to cash registering apparatus and has particular reference to such apparatus in which a single cash register is normally used by two or more sales persons or cashiers.

In conducting a sales transaction, a substantial part of the time involved is consumed in ringing up the sale on the cash register, making change and segregating the proper coinage and money denominations received into the appropriate till sections of the cash register drawer or drawers. Such drawer or drawers normally form a part of the cash register and is or are located directly adjacent the register to facilitate the process of completing the sales transaction.

It is customary in larger stores and other selling organizations for two or more persons to use the same cash register. In such cases, additional transaction time is consumed when one sales person must wait for a preceding sales person to complete his transaction, including making change, properly placing the money which has been received into the cash drawer, etc. Since such time constitutes a period of waiting on the part of both the sales person and the customer, it is a considerable source of annoyance.

A principal object of the present invention, therefore, is to reduce the time required to make a sales transaction.

Another object of the invention is to obviate the necessity of one sales person having to wait until a preceding sales person has completed his sales transaction before being allowed to ring up a new sale on the same cash register.

Another object of the invention is to reduce the number of cash registers required in a store or other selling organization without increasing the average time required to conduct a sales transaction.

Generally, the above objects are accomplished by providing at least two cash drawers spaced apart from each other and controlled by a single cash register which is movable from a position adjacent one drawer to a position adjacent another, the cash register controls being so arranged that one sales person may be ringing up a sale on the register when it is in a position adjacent one drawer, while another sales person may be making change, or placing money in another drawer, as an incident to having previously rung up a sale in the register.

The manner in which the above and other objects of the invention are accomplished will be readily understood on reference to the following specification when read in conjunction with the accompanying drawings, wherein:

Fig. 4 is an enlarged plan view, with parts in section and parts broken away, of the preferred embodiment with the register removed.

Fig. 5 is a schematic electrical diagram illustrating the electrical circuit connections for the apparatus shown in Figs. 1, 2 and 4.

Fig. 6 is a sectional view taken along lines 6—6 of Fig. 4 illustrating the cash drawer and turntable construction.

Fig. 7 is a fragmentary sectional view taken along the lines 7—7 of Fig. 6.

Fig. 8 is a sectional plan view taken along the line 8—8 of Fig. 6 illustrating part of the drawer guiding arrangement.

Fig. 9 is a sectional view through the register illustrating the clutch and switch controls.

Fig. 10 is a schematic view of modified form of the invention, illustrating the circuit connections thereof.

Figure 1:
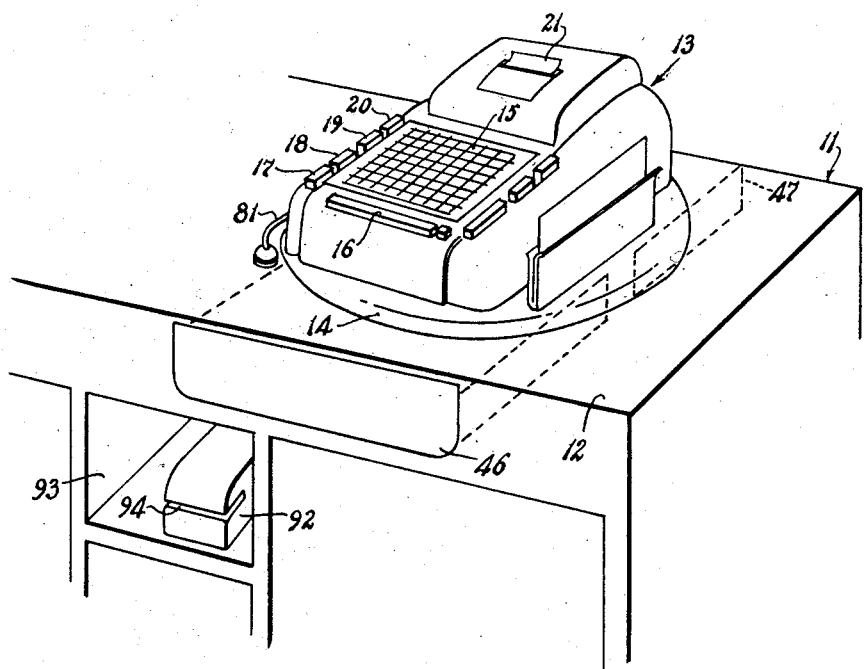
Fig. 1 is a perspective view of a cash registering apparatus embodying a preferred form of the present invention.
Figure 2:
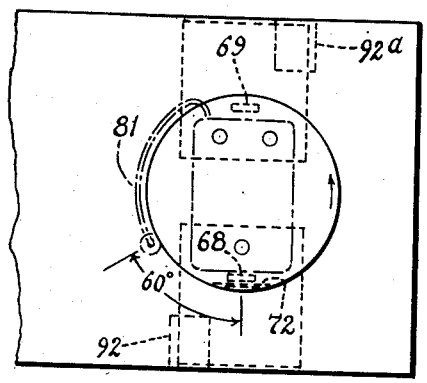
Fig. 2 is a plan view of the apparatus with the register removed.

Referring particularly to Figs. 1, 2 and 4 to 9, inclusive, the cash registering apparatus comprises a counter or cabinet 11 having a top surface 12 of a convenient height to form a counter surface for handling goods, etc. A register, generally indicated at 13, is mounted on a turntable 14 located substantially midway between the sides of the counter.

The register 13 is essentially similar in construction and operation to that of the well-known Clary adding machine. The latter is disclosed in substantially its commercial embodiment in patents to Robert E. Boyden, No. 2,583,810, issued on January 29, 1952; and Edward P. Drake, No. 2,472,696, issued on June 7, 1949. Since the register is disclosed in sufficient detail in the above noted patents to understand its construction and operation, only a description of the parts thereof pertaining to the mechanism of the present embodiment will be described herein.

The register comprises a full key keyboard 15 into which amounts may be entered. A plurality of depressible machine control bars are provided including an add bar 16, subtract bar 17, non add bar 18, subtotal bar 19 and total bar 20.

Depression of any of the control bars is effective to cause operation of the register to perform the function represented by the particular depression bar. Factors and results of calculations performed by the machine are printed on a paper tape 21 during each machine cycle.

Referring to Fig. 9, the control bars 17 to 20, inclusive, have their key stems 21 slideably mounted in aligned slots formed in guide plates 22 and 23 forming a keyboard frame. Each key stem overlies a pin 24 carried on an arm 25 which is pivotally mounted on a frame pin 26. A spring 27 is provided to normally hold each of the control bars in its upper position.

Each pin 24 overlies an inclined cam slot 28 formed in a clutch control bar 29 which is provided with guide slots 30 slideable over frame pins 31. Upon depression of any of the control bars, the slide 29 will be moved to the left in Fig. 9 and will be effective through a hook 32 to rock a clutch control dog 33 counterclockwise about a pivotal support 34 to cause engagement of a cyclically operable machine clutch 35. Concurrently, the clutch dog 33 is effective, through a switch control lever 36, to cause closing of a machine motor control switch 37, thereby causing operation of the machine.

The register 13 is removably mounted on top of the turntable 14 and for this purpose the supporting feet 38 (Fig. 6) thereof are fitted in shallow wells 39 formed in the top surface of the turntable.

The turntable is pivotally supported on the counter surface to permit the register to be swung through 180° from a position facing one side of the counter, as shown in Fig. 1, to a position facing the opposite side thereof for the purpose to be described hereinafter. The turntable is provided with a bearing 40 journaled on a pivot pin 41 secured to the top of the cabinet 11.

Ball bearing roller supports, generally indicated at 42, are equally spaced about the pin 41 to prevent binding of the bearing 40 as the register is swung about the axis of pin 41. The supports each comprise a cup-shaped element 43 suitably secured to the top of the counter and having rotatably fitted therein a ball bearing 44 extending in rolling engagement with the under-surface of the turntable. The bearing rests on a metal bearing disc 45 slideable along the bore of the element 43 and resting against a body of resilient material 45a such as rubber.

A pair of cash drawers 46 and 47 (Figs. 1, 2, 4 and 6) are mounted in the cabinet directly below the register 13 and in alignment with each other. However, the drawers are arranged to be opened from opposite sides of the cabinet under control of the register, depending upon the rotated position of the latter.

The construction of the drawers is similar and, therefore, only one, i.e. drawer 46, will be described in detail. The drawer is provided with channel members on opposite sides thereof, one in which is illustrated at 48, embracing rollers 49 and 50 rotatably mounted on a cabinet partition 51. An additional channel member 53 is attached to the bottom of the drawer and embraces guide rollers 54 rotatably mounted on a frame element 55 of the cabinet.

The drawer, which contains the usual coin and bill compartments 52, is urged toward open position by a spring 56 extending between a frame stud 57 and a cross member 58 mounted on the channel member 53. However, the drawer is normally held in its illustrated closed position by a drawer latch 59 pivotally supported at 60 by a bracket 61 depending from the top of the cabinet. A spring 62 tensioned between the latch and the top of the cabinet normally holds the latch in its drawer locking position.

A latch releasing solenoid 63 is mounted directly below the latch 59 by a bracket 64 attached to a channel member 65 forming part of the cabinet frame. The armature 66 of the solenoid is connected to the latch 59 by a link 67.

Means are provided whereby depression of the total bar 20 to effect a totaling operation of the register 13 will cause opening of one or the other of the cash drawers depending upon the position of the register. For this purpose, two normally open switches 68 and 69 are suitably secured to the top surface of the cabinet and are located within a depending skirt 70 of the turntable. Each switch has a plunger 71 which is engageable by a camming piece 72, see also Fig. 6, fixed to the turntable skirt. Thus, when the register is turned to face the side shown in Fig. 1, the switch 68, associated with the drawer 46, will be closed, whereas when the register is swung to face the opposite side, the switch 69 associated with a drawer 47 will be closed. It will be noted that the camming piece 72 is effective to close either of the switches within several degrees of its normal position so that the register need be swung only to the general vicinity of its two normal positions in order to close the corresponding switch.

Referring now to Figs. 5 and 9, the pin 24 associated with the total bar 20 overlies one end of a lever 75 pivoted on the frame pin 26a and urged counterclockwise by a tension spring 76 to hold a normally closed switch 77 in an open condition.

The solenoids 63 and 63a associated with the drawers 46 and 47, respectively, are connected in series with the switches 68 and 69, respectively. These elements are connected in a parallel circuit 78 across a power supply circuit 79, one of the leads of circuit 78 having in series therewith the total bar controlled switch 77. Thus, when the total bar is depressed, one circuit is completed from the power supply circuit 79, through the main switch 37 and register motor 80 to effect operation of the register, while another circuit is completed through whichever switch 68 or 69 is closed to energize the corresponding latch release solenoid 63 or 63a. Therefore, the drawer located on the side of the cabinet which the register faces will be opened.

In order to facilitate removal of the register 13 for servicing, replacing, or storing, the leads through the motor 80 and switches 37 and 77 are carried through a flexible conductor 81 to plug 82 which fits a socket 83 secured to the counter top, the socket being electrically connected to leads from the power supply, etc.

Means are provided for limiting the movement of the register through approximately 180° from one position to another. For this purpose, the camming piece 72, Fig. 7, is provided with a depending lug 84 which is engageable with one or the other of two stop pieces 85 and 86 attached to the top of the cabinet at diametrically opposite sides of the turntable.

The advantages of applicant's construction will become apparent in considering a case where one sales person may be carrying on a sales transaction by operating the register while another sales person is waiting to do likewise. Immediately after the first person has depressed the total bar after entering amounts into the register, the total is printed and the drawer located adjacent such person is opened. While change is being made or the proper coins or money denominations which have been received are being placed in the appropriate sections of that cash drawer, the second sales person may swing the cash register around to face the opposite side of the cabinet and commence entering the amount of his sales transaction, etc., thus saving considerable overall time in conducting the sales transactions.

On the other hand, different sales persons may be authorized to use one or the other of the drawers, the selection of the same being made by swinging the register to face the proper drawer. By swinging the register to a position intermediate its two cash drawer positions, neither drawer will open upon operation of the register, thus presenting an additional safeguard.

Figure 3:
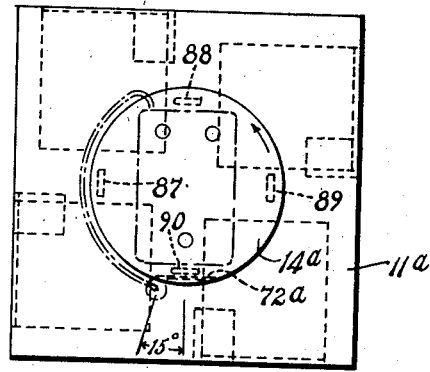
Fig. 3 is a plan view similar to Fig. 2, illustrating a modified form of the invention.

Referring now to the modified form illustrated in Fig. 3, the cabinet 11a of the latter is made substantially square when viewed from the top, the turntable 14a being located in the center. Four switches 87, 88, 89 and 90, similar to the switches 68 and 69 (Fig. 6) are mounted on the counter top within the skirt of the turntable 14a and are connected in series with respective ones of four drawer lock release solenoids, not shown, similar to the solenoids 63 and 63a. These switches are selectively closed by a camming piece 72a carried by the turntable 14a and cooperating with the switches in a manner similar to the camming piece 72. In this case, stop elements similar to the elements 85 and 86 are provided but are arranged to permit the turntable and register carried thereby to move through approximately 270° only so as to face any of the four sides of the cabinet to accordingly control any of the four drawers. The circuit connections for this arrangement are similar to that shown in Fig. 5, the additional drawer latch release solenoids and switches therefor being connected in parallel across a current supply circuit similar to the circuit 78.

Fig. 10 illustrates another modified form of the invention in which validating or stamping devices are incorporated in the cash registering apparatus. In this case, validating devices, generally indicated at 92 and 92a (Figs. 1 and 2) are located in compartments, i.e. 93, on opposite sides of the cabinet 11 and adjacent respective ones of the cash drawers. Such validating devices are well known in construction. Reference may be had to the patent to Benjamin Cooper No. 2,268,924, issued on January 6, 1942, for a complete disclosure of such a unit.

When a piece of paper, for example, a portion of the tape 21 having data printed thereon by the register 13, is placed in a throat 94 of the device 92 or 92a and against a suitable switch device, the time of day and/or other data will be printed on the paper. Such switch devices include contacts 95 and 96 (Fig. 10), one for each validating device, and each located in series with one of the drawer latch release solenoids 63 and 63a.

This arrangement enforces validation of each section of the tape 21 representing a sales transaction. That is, after amounts have been entered into the register and the total bar depressed to obtain a total, the printed tape section representing the sales transaction is severed and placed in the validating device 92 or 92a, whichever is located at the side of the counter toward which the register currently faces. As the validator switch 95 or 96 is accordingly closed, a circuit is completed to release the respective drawer to make change or enter money.

Although I have described my invention in detail in its preferred and modified forms and have therefore utilized certain specific terms and languages herein, it is to be understood that the present disclosure is illustrative rather than restrictive.

Having thus described my invention, what I desire to secure by United States Letters Patent is:

1. In an apparatus of the class described, a cash register having control instrumentalities thereon for controlling said cash register; first and second cash drawers spaced laterally apart from each other, latches for normally maintaining respective ones of said drawers in inaccessible positions, means supporting said cash register for movement from a first position wherein said control instrumentalities are located adjacent said first drawer to a second position wherein said control instrumentalities are located adjacent said second drawer, means responsive to movement of said cash register into said first position for enabling said control instrumentalities to release the said latch for said first drawer, and means responsive to movement of said cash register into said second position for enabling said control instrumentalities to release the said latch for said second drawer.

2. In an apparatus of the class described, a cash register including a manually operable control element therefor; first and second cash drawers spaced laterally apart from each other, latches for normally maintaining respective ones of said drawers in inaccessible positions, means supporting said cash register for movement from a first position wherein said control element is located adjacent said first drawer to a second position wherein said control element is located adjacent said second drawer, and means responsive to movement of said cash register into said first position for enabling said control element to cause release of the said latch for said first drawer, said last mentioned means being responsive to movement of said cash register into said second position for enabling said control element to cause release of the said latch for said second drawer.

3. In an apparatus of the class described, a cash register having control instrumentalities thereon for controlling said cash register; first and second cash drawers spaced laterally apart from each other, latches for normally maintaining respective ones of said drawers in inaccessible positions, means for releasing said latches, means supporting said cash register for movement from a first position wherein said control instrumentalities are located adjacent said first drawer to a second position wherein said control instrumentalities are located adjacent said second drawer, means responsive to movement of said cash register into said first position for conditioning said latch releasing means to release the said latch for said first drawer, said last mentioned means being responsive to movement of said cash register into said second position for conditioning said latch releasing means to release the said latch for said second drawer, and a manually operable member for causing operation of said latch releasing means.

4. In an apparatus of the class described, a cash register having control instrumentalities thereon for controlling said cash register; first and second cash drawers spaced laterally apart from each other, means for maintaining said drawers in inaccessible positions, a drawer releasing device controlled by said cash register, means for supporting said cash register for movement from a first position wherein said control instrumentalities are located adjacent said first drawer to a second position wherein said control instrumentalities are located adjacent said second drawer, means controlled by said cash register when moved to said first position for conditioning said drawer releasing device to release said first drawer for movement to an accessible position, and means controlled by said cash register when moved into said second position for conditioning said drawer releasing device to release said second drawer for movement to an accessible position.

5. In an apparatus of the class described, a cash register having control instrumentalities thereon for controlling said cash register; first and second cash drawers spaced laterally apart from each other, latches for normally maintaining respective ones of said drawers in inaccessible positions, means for supporting said cash register for movement from a first position wherein said control instrumentalities are located adjacent said first drawer to a second position wherein said control instrumentalities are located adjacent said second drawer, means responsive to movement of said cash register into said first position for selecting the said latch for said first drawer to release said first drawer, means responsive to movement of said cash register into said second position for selecting the said latch for said second drawer to release said second drawer, and means controlled by said manually operable device for causing release of a selected one of said latches.

6. In an apparatus of the class described, a cash register having control instrumentalities thereon for controlling said cash register; first and second cash drawers spaced laterally apart from each other, latches for normally maintaining respective ones of said drawers in inaccessible positions, electromagnetic devices for releasing respective ones of said latches, means supporting said cash register for movement from a first position wherein said control instrumentalities are located adjacent said first drawer to a second position wherein said control instrumentalities are located adjacent said second drawer, normally unconditioned circuits for respective ones of said electromagnetic devices, means controlled by said cash register upon movement thereof into said first position for conditioning the said circuit associated with said first drawer, said means being controlled by said cash register upon movement thereof into said second position for conditioning the said circuit associated with said second drawer, and means for completing a conditioned one of said circuits.

7. In a machine of the class described, a cabinet, a plurality of cash drawers, means supporting said cash drawers for movement between accessible and inaccessible positions in said cabinet, said cash drawers being located on different sides of said cabinet, latches for normally maintaining respective ones of said drawers in inaccessible positions, a cash register, means pivotally supporting said cash register on said cabinet for movement into different positions facing different ones of said sides, drawer releasing means, and means controlled by said cash register upon movement thereof into any of said positions thereof for enabling said drawer releasing means to release a said latch associated with a drawer on the side of said cabinet on which said cash register is located.

8. In a machine of the class described, a cabinet, a plurality of cash drawers, means supporting said cash drawers for movement between accessible and inaccessible positions in said cabinet, said cash drawers being located on different sides of said cabinet, latches for normally maintaining respective ones of said drawers in inaccessible positions, electro-magnetic devices for releasing respective ones of said latches, a cash register, means pivotally supporting said cash register on said cabinet for movement into different positions facing different ones of said sides, and means responsive to movement of said cash register into any of said positions for conditioning one of said electromagnetic devices to release a said latch associated with a drawer on the side of said cabinet on which said cash register is located.

References Cited in the file of this patent

UNITED STATES PATENTS

| | | |
|---|---|---|
| 686,005 | Muzzy | Nov. 5, 1901 |
| 847,479 | Jackson | Mar. 19, 1907 |
| 1,080,001 | Cleal | Dec. 2, 1913 |
| 1,726,775 | Sundstrand | Sept. 3, 1929 |
| 2,143,292 | Wheelbarger | Jan. 10, 1939 |
| 2,230,444 | Balster | Feb. 4, 1941 |
| 2,607,526 | Boyden et al. | Aug. 19, 1952 |
| 2,724,550 | Drake et al. | Nov. 22, 1955 |

FOREIGN PATENTS

| | | |
|---|---|---|
| 1,104,831 | France | June 22, 1955 |